United States Patent [19]

Nagoshi

[11] Patent Number: 4,634,261
[45] Date of Patent: Jan. 6, 1987

[54] OPTICAL SYSTEM FOR REPRODUCING APPARATUS

[75] Inventor: Mitsuru Nagoshi, Tokyo, Japan

[73] Assignee: Konishiroku Photo Industry Co., Ltd., Tokyo, Japan

[21] Appl. No.: 719,631

[22] Filed: Apr. 4, 1985

Related U.S. Application Data

[62] Division of Ser. No. 394,171, Jul. 1, 1982.

[30] Foreign Application Priority Data

| Jul. 7, 1981 | [JP] | Japan | 56-106410 |
| Jul. 7, 1981 | [JP] | Japan | 56-106411 |
| Aug. 31, 1981 | [JP] | Japan | 56-129092 |
| Aug. 31, 1981 | [JP] | Japan | 56-136737 |
| Aug. 31, 1981 | [JP] | Japan | 56-136738 |

[51] Int. Cl.[4] ............................................. G03G 15/00
[52] U.S. Cl. .................................... 355/8; 355/14 E; 355/3 R; 355/11; 355/55
[58] Field of Search .................. 355/8, 14 E, 3 R, 11, 355/59, 55, 56, 67

[56] References Cited

U.S. PATENT DOCUMENTS

| 3,486,807 | 12/1969 | Pignone | 355/62 |
| 4,200,391 | 4/1980 | Sakamoto et al. | 355/14 E |
| 4,239,374 | 12/1980 | Tatsumi et al. | 355/3 DD X |

Primary Examiner—A. C. Prescott
Attorney, Agent, or Firm—James E. Nilles

[57] ABSTRACT

An optical system of a reproducing apparatus having an exposure light source wherein the reflector of said exposure light source has a form of a curve of secondary degree and is adapted to be split into an upper half part and a lower half part at the non-reflecting surface of said reflector, said upper half part and lower half part being connected with a connecting member. The exposure device has a holding frame for holding an exposure optical system and guide members for movably guiding said holding frame. The guide members include an upper guide member disposed at the upper side of said holding frame and a lower guide member disposed at the lower side of said holding frame, said holding frame making a sliding contact with said lower guide member and contacting said upper frame member through an elastic member. On a lower position of said upper guide member is disposed an electrical collecting member.

8 Claims, 9 Drawing Figures

OPTICAL SYSTEM FOR REPRODUCING APPARATUS

This application is a division of application Ser. No. 394,171, filed July 1, 1982.

BACKGROUND OF THE INVENTION

1. Field of the Invention

The present invention relates to an exposure light source device in reproducing apparatus or the like.

2. Description of the Prior Art

Generally, in reproducing apparatus such as an electronic copying machine, light is applied to an original mounted on a document glass plate from a light source and the reflected light is transmitted through an optical system including a mirror and so forth to the surface of a photosensitive member thereby to form an optical image on the surface of the photosensitive member to record an image.

There are two types of apparatus of the kind described, namely, apparatus in which the optical system is moved while the document glass plate is stationary and apparatus in which the document glass plate is moved while the optical system is stationary.

Figure 1:
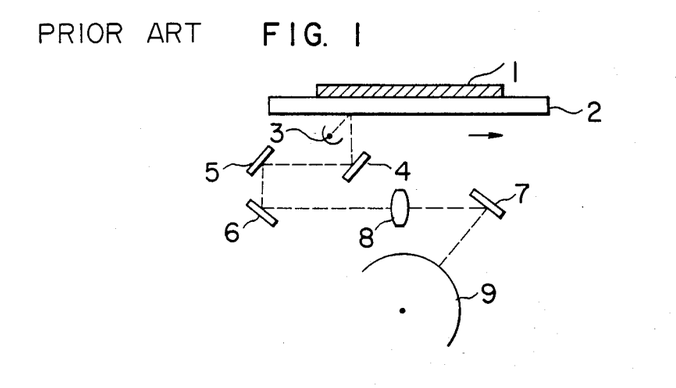
FIG. 1 is an illustration of the optical system of a conventional reproducing apparatus.

FIG. 1 schematically shows an exposure device of the type in which the optical system is moved. An original 1 is placed on a transparent document glass plate with the printed side thereof directed downwardly. As the original is illuminated by light coming from an illuminating lamp 3, the light reflected by the printed surface is transmitted to the surface of a photosensitive member 9 through reflecting mirrors 4, 5, 6 and 7. A reference numeral 8 denotes a focussing lens for forming an image. The optical system having the described construction operates in a manner explained hereinunder. As the illuminating lamp 3 lights up, the first reflecting mirror 4 movable integrally with the lamp 3 is moved at a velocity v in parallel with the original, as indicated by an arrow. The second reflecting mirror 5 and the third reflecting mirror 6 are moved in parallel with the original simultaneously with the movement of the first reflecting mirror 4. However, in order to maintain a light path of constant length, the second and third mirrors 5 and 6 move at a velocity of ½ v. In consequence, the entire surface of the original is scanned optically, so that the light reflected by the image is transmitted to the surface of the photosensitive member 9. Meanwhile, the surface of the photosensitive member 9 is rotated at the same velocity v as the first reflecting mirror 4, so that the reflected light is projected upon the surface of the photosensitive member 9 to form precisely a photo image of the original.

In the moving optical system described above, the second reflecting mirror 5 and the third reflecting mirror 6 are adapted to move as a unit with each other at a velocity which is a half of that of the first reflecting mirror 4. More specifically, the two reflecting mirrors are secured to a common reflecting mirror holder, and are moved along a rail which is usually disposed at the driving side for the holder by being towed by a wire of the like.

Reproducing apparatus such as an electronic copying machine having an optical system of the type mentioned above is becoming popular, thus giving rise to a demand for compact and light-weight construction which, in turn, requires a compact and light-weight exposure device.

On the other hand, the light source device consisting of illuminating lamp is adapted to move along a guide rail in unison with the holder for the first reflecting mirror. In conventional apparatus, electric power is supplied to the light source through a flexible power supply cord which stretches to follow the movement of the holder for the first reflecting mirror. In a moving type exposure device in which the light source device and the holder for the first reflecting mirror are moved along the guide rail, there is the problem that scanning is inconveniently unstabilized as the velocity of the moving exposure device is increased to meet the demand for higher copying speed. In addition, supplying power to the moving exposure device through a power supply cord to the light source device is not considered appropriate in view of current demand for compact construction of the apparatus.

As is well known, in an electronic copying machine, optical scanning of the original is made by synchronously moving a plurality of moving plates each carrying an exposure slit and a mirror. The synchronous driving of the plurality of moving plates is effected by means of a wire-pulley device stretched between one end of the moving plate and a stationary part of the apparatus. According to this single-side driving system, it is necessary to increase the holding span for the guide member, so that the size of the slit type exposure device is increased impractically. Therefore, in conventional apparatus, a so-called two-side driving system employing wire-pulley devices disposed at both sides of the moving plate has been adopted to decrease the holding span thereby to reduce the size of the apparatus as a whole. Even in such an improved apparatus, however, the plurality of moving plates are adapted to be moved along the same track surface. As a result, there is a practical limit by which the distance between the mirrors on the adjacent moving plates can be reduced, and the size of the apparatus as a whole cannot be reduced to such an extent as desired.

In the slit exposure optical system in which the first and second moving plates of the optical system are mounted on the guide member, the first and second moving plates must be of certain weights. Specifically, if the weight of a moving plate is reduced unlimitedly, the moving plate will float above the track surface undesirably and cause a disturbance in the image. However, from the viewpoints of improvement in the start-up characteristics of the slit exposure device and reduction in size of the driving motor, it is preferred that the weight of the first and second moving plates be reduced.

Conventionally, the mirror assembly has been produced by die-casting and the mirror mounting surfaces are finished highly precisely because it is necessary to mount the two mirrors with high optical precision. This arrangement, however, increases the weight of the mirror assembly inconveniently, although sufficient precision is obtained, so that the driving torque which has to be exerted by the wire-pulley device is increased. Moreover, die-casting and fine finishing uneconomically raises the cost of production. Therefore, recently, it was proposed to form a part of the mirror assembly by plate-work. This, however, makes it difficult to obtain the desired optical precision and requires fine adjustment using spacers or the like in mounting the mirrors. This is disadvantageous from the standpoint of labor and time.

SUMMARY OF THE INVENTION

Accordingly, an object of the invention is to provide a light source device for exposure in reproducing apparatus or the like, in which the construction is compact and weight is reduced without being accompanied by substantial deterioration in the illuminating efficiency of the light source.

The present inventor has found, as a result of intense study of the above-mentioned technical subject, that the above-mentioned technical object is achievable, in an optical system of a reproducing apparatus having an exposure optical system provided with an exposure light source and a plurality of reflecting mirrors, by providing an exposure device in which the reflector of the exposure light source has an oval shape conforming with a curve of secondary degree to realize compact construction, and in which the reflector is adapted to be split into an upper half and a lower half at the nonreflecting portion thereof.

Another object of the invention is to provide a moving type exposure device having compact construction and reduced weight and, in addition, capable of performing stable scanning with the light source device and the mirror.

The present inventor has found, as a result of a study made to achieve this object, that the object is achievable, in a moving type exposure device having a holder holding an exposure optical system and vertically opposing guide members adapted to movably guide the holder, by providing a moving exposure device having an electricity-collecting rail provided on the guide member and an electricity-collecting brush pressed against the collecting rail on the guide member.

Still another object of the invention is to provide, in view of the present state of the art of slit exposure optical systems, a system in which a pair of wire-pulley devices are disposed at both ends of moving plates, so that the moving plates are guided along independent track surfaces which are spaced in the vertical direction and made integral with the guide member.

A further object of the invention is to provide, in view of the problems concerning the design of the slit exposure device, a slit exposure device in which the direction of stretching of the wire connected to the moving plate is inclined with respect to the track surface to permit the optical moving plate to move perfectly following the track surface, even if the moving plate has reduced weight.

A still further object of the invention is to provide, in view of the present state of the art of mirror assemblies, a mirror assembly having reduced weight and permitting an easy and prompt mirror adjustment with a simple jig.

Other objects, features and advantages of the invention will become clear from the following description of the preferred embodiments taken in conjunction with the accompanying drawings.

DESCRIPTION OF THE PREFERRED EMBODIMENTS

Figure 2:
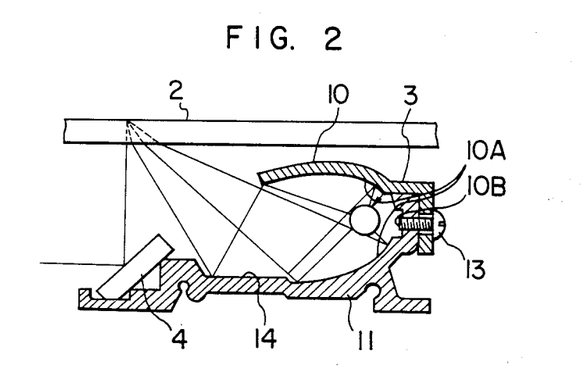
FIG. 2 is a side elevational view of an essential part of the optical system of a reproducing apparatus, constructed in accordance with the invention.

Referring first to FIG. 2 in which the same reference numerals are used to denote the same parts or members as those in FIG. 1, an illumination device has a frame 11, a part of which constitutes a reflector 10. The reflecting surface 10A presented by the reflector 10 and the portion of the frame opposing the same is formed by an elliptic curve. An illuminating lamp 3 is disposed at a position where the light is concentrated by the reflecting surface 10A formed by the elliptic curve. The arrangement is such that the inner surface of the reflector 10 and the surface presented by the portion of the frame 11 opposing to the reflector 10 constitute equal two halves or segments of the reflecting surface formed by the elliptic curve. More specifically, the reflecting surface 10A is divided at the non-reflecting surface 10B behind the lamp 3 into two segments of the reflector 10 and the frame 11. Thus, the reflector 10 and the frame 11 are connected to each other at the non-reflecting surface 10B to form the unitary reflecting surface 10A by means of screws 13.

A reference numeral 14 designates a planar second reflecting mirror formed on the inner surface of the frame 11 and adapted to reflect the light emitted from the lamp 3 and then reflected by the reflecting surface 10A thereby to efficiently expose an original 1. A first reflecting mirror 4 is disposed within the frame 11. According to the described arrangement in accordance with the invention, when it becomes necessary to, for example, polish the inner surface of the reflector 10, the polishing can be done easily because the reflector 10 can be separated from the frame 11 by loosening the screws 13. Thus, it is possible to effect buffing which can hardly be conducted through the small opening of the reflector 10. After polishing, the reflector 10 is superposed to the non-reflecting surface 10B of the frame 11 and is connected to the same by means of the screws 13 to form a reflecting surface of an elliptic form having a restricted opening and an ample internal space. This construction permits an easy convergence of the light beam to one point and can provide a high reflection factor which, in turn, ensures high illumination efficiency of the illuminating lamp 3. This conveniently permits the use of an illuminating lamp having a lower intensity of light. Needless to say, the frame 11 can be shaped from a metal such as aluminum or a heat resistant resin. Furthermore, since the first reflecting mirror 4 is held by the frame 11, the construction of the illuminating device is compact and the weight of the same is reduced advantageously.

Figure 3:
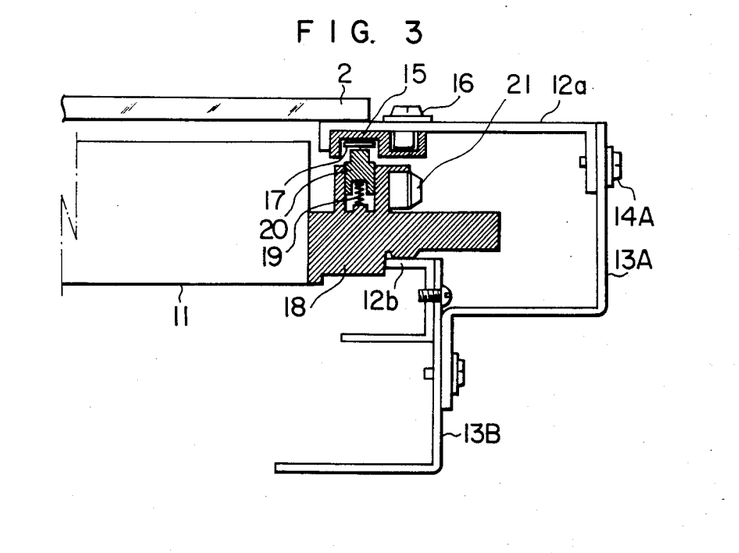
FIG. 3 is a vertical sectional front elevational view of as essential part of a moving illuminating device in accordance with the invention.

Referring now to FIG. 3 showing an essential portion of a moving illuminating device, the frame 11 is adapted to be guided by an upper guide member 12a and a lower guide member 12b. The upper guide member 12a is fixed to the side panel 13A of the body of the reproducing apparatus by means of screws 14A, while the lower guide member 12b is secured integrally by a screw or the like to another side panel 13B which, in turn, is attached by means of screws to the side panel 13A. A reference numeral 15 designates a cover for an electrical collecting rail, attached to the upper guide member 12a by means of screws 16 and having a concave cross-section for receiving the electrical collecting rail 17 which is bonded thereto or formed integrally therewith. The cover 15 is preferably made of an electrically insulating material such as a synthetic resin, while the electrical collecting rail 17 is made from, for example, a metallic material having high electric conductivity and high wear resistance.

A reference numeral 18 designates an insulating block formed at the end of the first reflecting mirror holding frame 11 and made from, for example, a synthetic resin having high electric insulating properties. A reference numeral 19 designates a compression spring arranged in a recess formed in the insulating block 18. The compression spring 19 is adapted to press an electrical collecting brush 20 against the collecting rail 17. The electrical collecting brush 20 is made of a highly conductive and flexible metallic material, preferably a copper alloy. Terminals 21 for the illuminating lamp 3 are provided at one side of the above-mentioned insulating block 18.

The moving illuminating device of the invention having the described construction operates in a manner explained hereinunder. In the scanning operation of the optical system, the frame 11 is moved along the guide members 12a, 12b in the back and forth direction as viewed in the drawing. In operation of the optical system, the insulating block 18, which is formed integrally with the first mirror holding frame 11 at one end of the latter, rests at its bottom on the lower guide member 12b fixed to the body of the apparatus, while the head portion of the insulating block 18 is movable in such a way that the electrical collecting brush 20 pushed up by the compression spring 19 is pressed against the rail 17 which is fixedly mounted in the recess in the cover 15. Therefore, the running motion of the light source and the first reflecting mirror is extremely stabilized to permit high speed scanning. In addition, extraordinary operation, such as offset of the insulating block 18 or vibration of the same on the guide member 12b, is avoided, even if the insulating block 18, which is merely placed on the guide member 12b, is slid at a high speed, so that uneven brightness distribution in the reproduced image is effectively avoided. Furthermore, since electric power is supplied to the illuminating lamp through the collecting rail and the collecting brush, the construction of the apparatus is much more compact, as compared to conventional apparatus in which power is supplied through a flexible cord which flexes while following the movement of the optical system.

Figure 4:
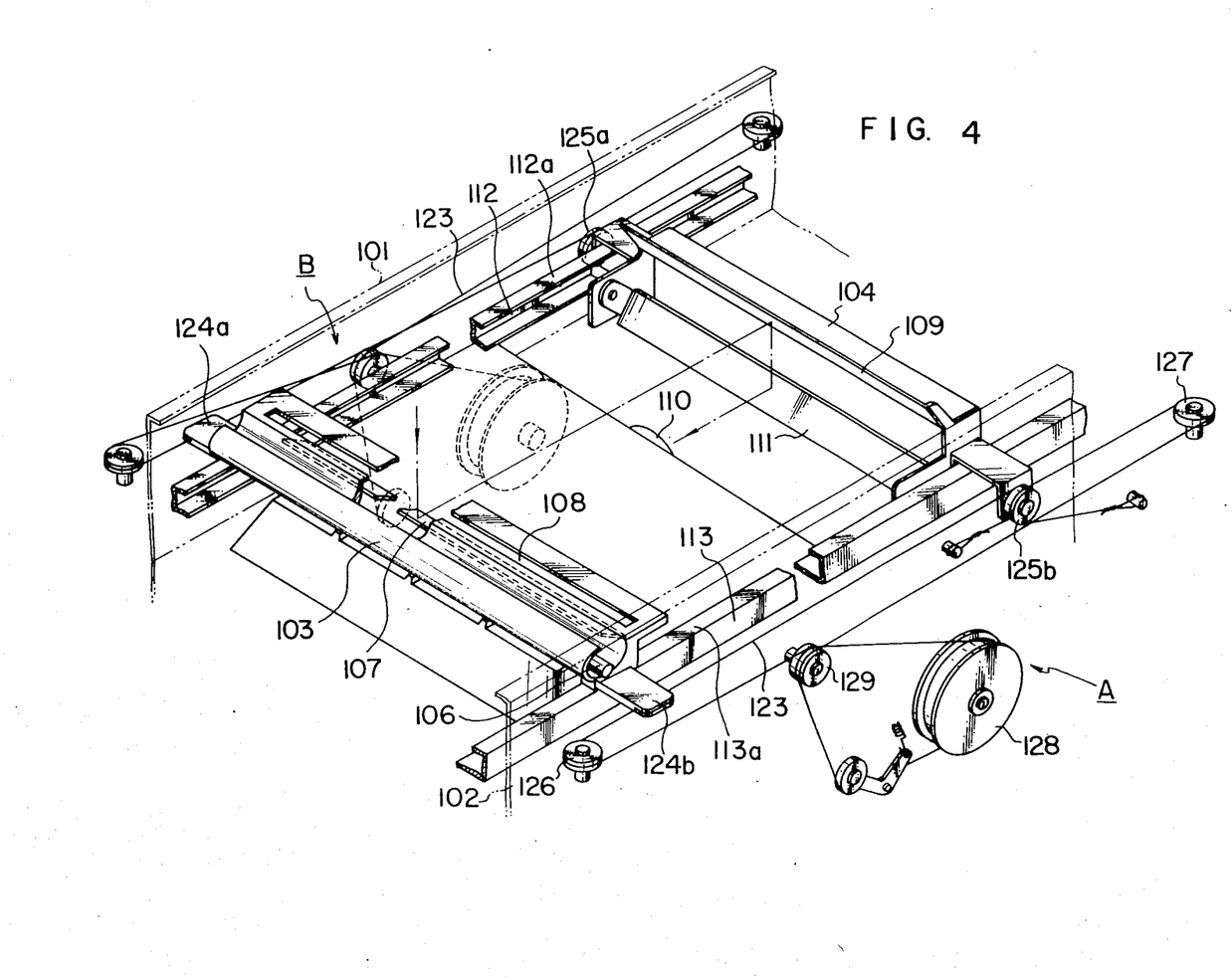
FIG. 4 is a perspective view of a slit exposure optical device in accordance with the invention.
Figure 5:
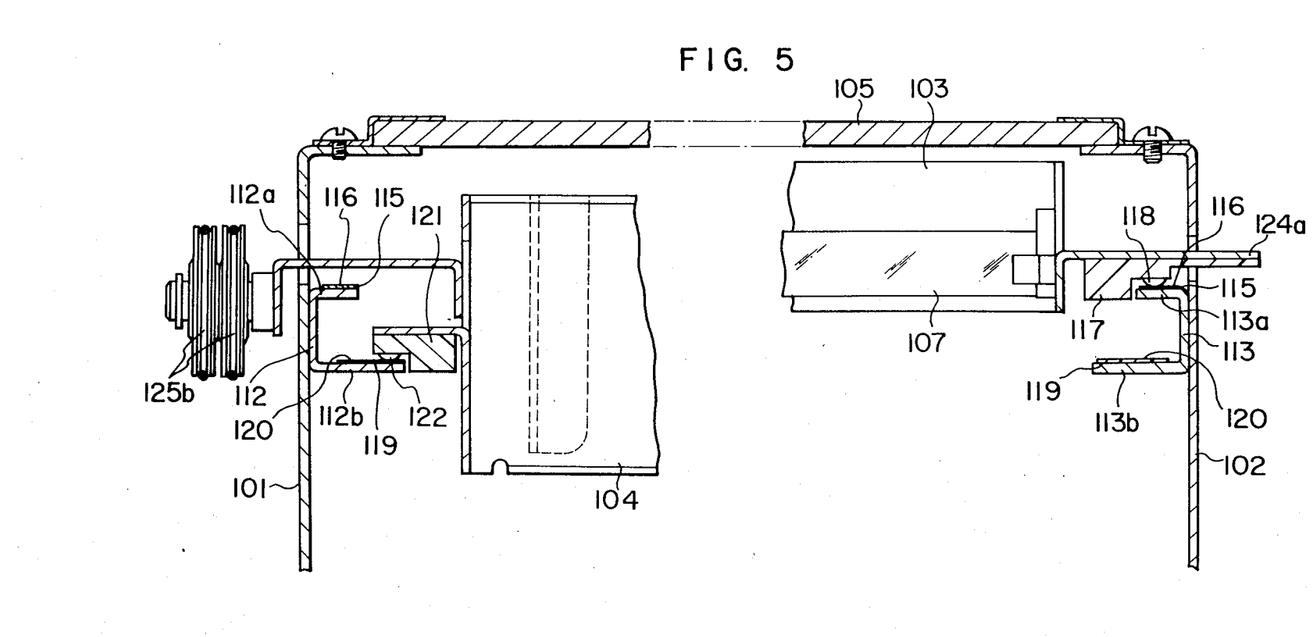
FIG. 5 is a sectional view of the slit exposure optical device shown in FIG. 4.

FIG. 4 is a perspective view of a slit exposure device in accordance with the invention. The slit exposure device is provided with moving plates 103 and 104 disposed between a pair of machine frames 101 and 102 opposing each other. The first moving plate 103 has an exposure lamp 106 for illuminating an original on a document glass plate 105 (See FIG. 5) and a slit 108 through which the reflected image of the original is applied to the first mirror 107. On the other hand, the second moving plate 104 has a second mirror 109 adapted to perpendicularly reflect the light coming from the first mirror 107 and a third mirror 111 adapted to reflect the light from the second mirror 109 towards a projection lens 110. The first and second moving plates 103 and 104 are adapted to be guided at both end positions by means of a pair of U-shaped channels 112, 113 horizontally arranged and fixed to the inner surfaces of the frames 101 and 102. In particular, pieces of plastic tape 115 having a small coefficient of friction are adhered to the upper surfaces of upper sides 112a, 113a of the integral U-shaped channels 112, 113 so that the surfaces of the pieces of tape constitute a first track surface 116. The first track surface 116 is contacted by a spherical projection 118 of a resin block 117 fixed to each end of the first moving plate 103. At the same time, pieces of plastic tape 119 similar to the tape 115 are adhered to the upper surfaces of the lower sides 112b, 113b of the U-shaped channels 112, 113. The upper surfaces of the pieces of plastic tape 119 constitute a second track surface 120 which is contacted by the spherical projection 122 of a resin block 121 formed at each end of the second moving plate 104. Joint tabs 124a, 124b adapted to be fixed to intermediate portions of a later-mentioned driving wire 123 are projected from both ends of the first moving plate 103, while both ends of the second moving plate 104 carry idle pulleys 125a, 125b. A pair of wire-pulley devices A, B are disposed at both ends of the first and second moving plates 103, 104 and adjacent portions of the machine frames 101, 102, so that the first and second moving plates 103, 104 are adapted to be driven from both sides thereof. More specifically, as represented by the device A, the wire-pulley deivce has a pair of fixed pulleys 126, 127 opposing the machine frame 102, a drive drum 128 adapted to rotate at a constant speed and a relay pulley 129. The drive wire 123 stretched over these pulleys and drum is adapted to drive the second moving plate 104 in synchronization with the movement of the first moving plate 103 at a speed half of that of the latter.

Figure 6:
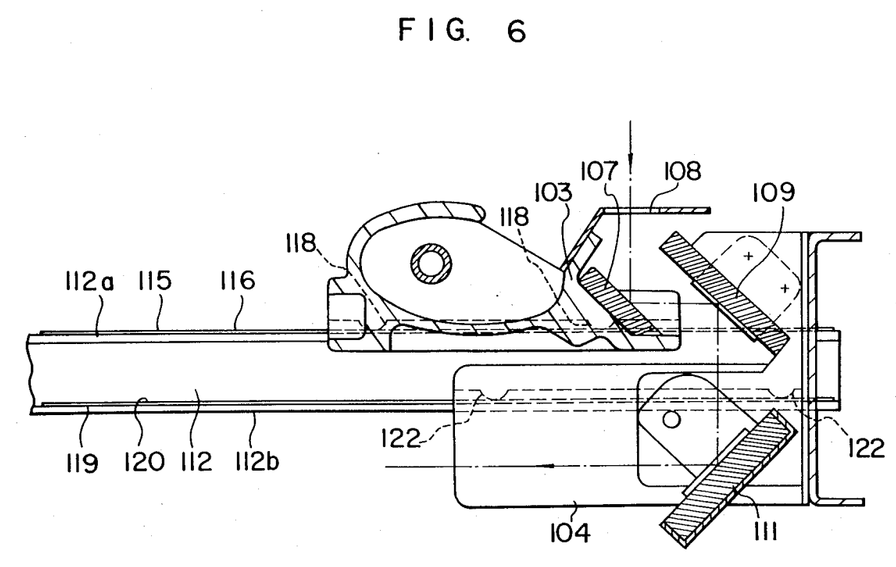
FIG. 6 is a sectional view in the state in which the first and second moving plates are moved toward each other.

In operation of the slit exposure optical device having the described construction, the first and second moving plates 103, 104 are driven in synchronization at both sides thereof, so that it is possible to effect a precise synchronous operation even if the holding span for the track surface is small. Particularly, since both moving plates 103, 104 are guided independently by the first track surface 116 and the second track surface 120 which are offset from each other in the vertical direction such that one member has two guide surfaces, it is possible to design the device in such a way to permit the first and second moving plates to be superposed as illustrated in FIG. 6, so that the exposure optical system as a whole can have compact construction and reduced weight.

Figure 7:
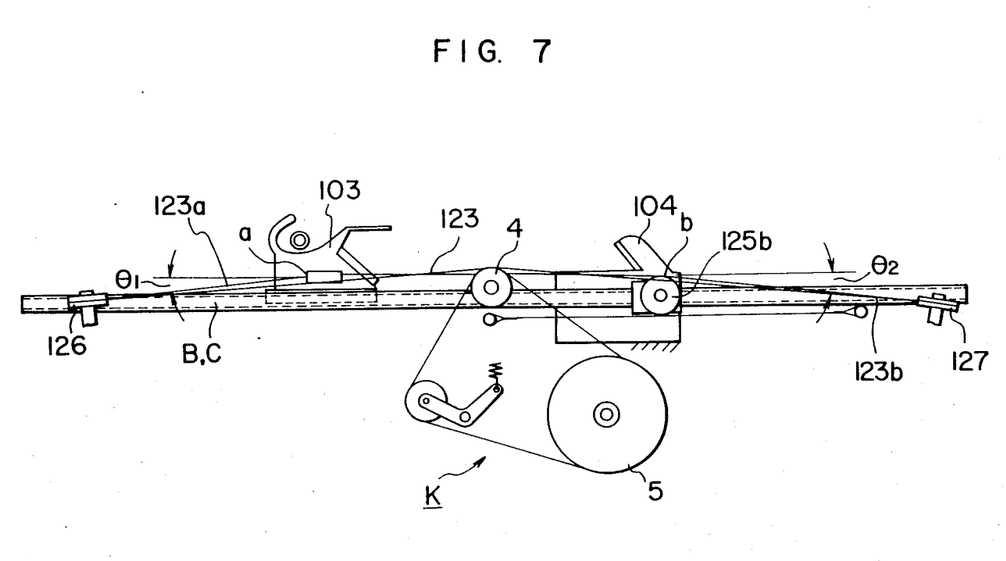
FIG. 7 is an illustration of another example of the slit exposure optical device in accordance with the invention.

FIG. 7 shows another form of slit exposure optical device in accordance with the invention in which the fixed pulleys 126, 127 are positioned somewhat below the point (a) of connection of the wire to the first moving bed 103 and the point (b) of winding of the wire around the moving pulley 125b. Therefore, an angle $\theta_1$ is formed between the track surface 116 of the channels 113 and the portion 123a of the driving wire 123, while an angle $\theta_2$ is formed between the track surface 116 (FIG. 6) and the portion 123b of the wire 123.

In this slit exposure optical device having the described construction, the first and second moving plates 103, 104 are subjected to the following forces during movement along the channels 112, 113. Representing the tension in the driving wire during operation by T, a downward force T tan $\theta_1$ is applied to the first moving plate 103 while the second moving plate 104 is subjected to a downward force T tan $\theta_2$. The composite force of these downward forces effectively presses the first and second moving plates 103, 104 onto the channels 112, 113 so that undesirable floating of the first and second moving plates 103, 104 during running is avoided, even if these plates have reduced weights. Thus, according to this embodiment, it is possible to obtain a slit exposure optical device having reduced weight and capable of moving perfectly following the track surface to ensure high quality of the reproduced image. The second moving plate 104 is driven at a speed which is a half of that of the first moving plate.

Figure 8:
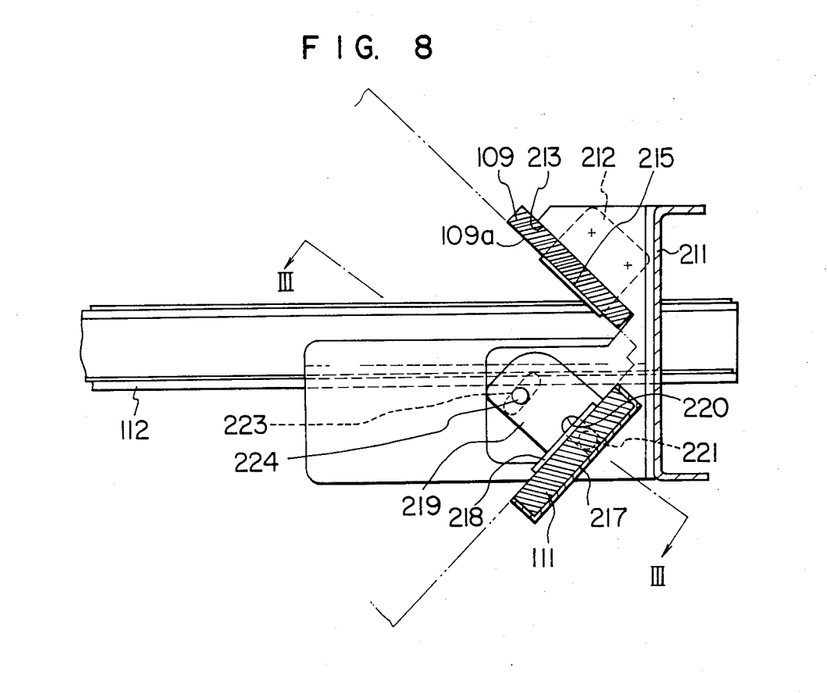
FIG. 8 is a sectional view of a mirror assembly in accordance with the present invention.
Figure 9:
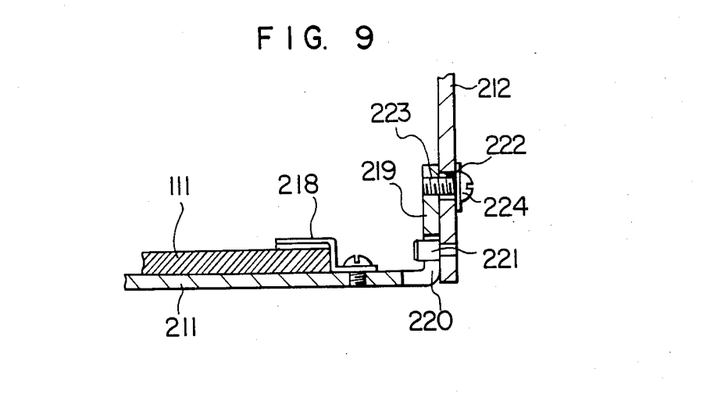
FIG. 9 is a sectional view taken along the line III—III of FIG. 8.

FIGS. 8 and 9 show a further embodiment in which the mirror assembly is provided with a channel, i.e. stiffener 211 having a U-shaped cross-section and adapted to be guided at its both ends by the channels 112, 113. Mounting plates 212 formed by punching are fixed by, for example, welding to the surface of both ends of the stiffener 211. The second mirror 109 is seated at its rear surfaces of both ends thereof on the tapered surfaces 213 of the mounting plates 212 and is secured to the mounting plates 212 by means of a leaf spring 215. On the other hand, the third mirror 111 is fixed by means of a retainer 218 to the surface of a mirror holding frame 217 having an elongated U-like form. The mirror holding frame 217 has a pair of side flaps 219 extending in parallel with the mounting plates 212. Elongated holes 220 substantially parallel to the reflecting surface 109a of the second mirror 109 are formed in the base portions of the side flaps 219. The elongated holes 220 slidably receive pins 221 formed on opposing surfaces of the mounting plates 212.

On the other hand, elongated holes 222, each having a large diameter and permitting free adjustment in right and left directions, as well as in an angular direction, are formed in the portions of the mounting plates 212 facing the side flaps 219. Fixing screws 224 are adjustably screwed into threaded holes 223 formed at portions of the side flaps 219 aligning with the elongated holes 222.

In the mirror assembly of the described embodiment of the invention, the adjustment of angle and relative position between the second mirror 109 and the third mirror 111 can be made simply as follows. After loosening the fixing screws 224, a suitable jig such as a perpendicular rule is placed between the second mirror 109 and the third mirror 111 as shown by imaginary line in FIG. 8, so that the distance of the third mirror required in relation to the second mirror 209 is adjusted by the cooperation between the pin 221 and the elongated hole 220, while the perpendicularity is obtained strictly by rotation of the mirror holding frame 217 around the pin 221. It is, therefore, possible to complete the adjustment by fixing the mirror holding frame 217 to the mounting plates 212. In consequence, according to the invention, a mirror assembly having reduced weight can be mass-produced at a lower cost and the angle between the mirrors can be adjusted easily.

What is claimed is:

1. An electrophotographic reproducing apparatus comprising a stationary document glass plate on which a document to be reproduced is placed, a first scanning means which comprises a reflector having a reflecting surface formed by an elliptic curve and arranged below the document glass plate so that an opening portion of the reflector for exposing the document faces a direction substantially parallel with the surface of said document glass plate, an illuminating lamp for exposure arranged in said reflector, and a first mirror, and a second scanning means which comprises a second mirror, said first and second scanning means movable so that said second scanning means moves at half the speed of the speed of said first scanning means wherein said document glass plate, reflector, and illuminating lamp for exposure are so arranged mutually that a light from said lamp is reflected from the reflecting surface which is positioned on a remote side part of said reflector with respect to said document glass plate and then focused on a predetermined position on said document glass plate.

2. The electrophotographic reproducing apparatus according to claim 1, wherein said remote side part has a flat surface continuing to the surface of said elliptic curve.

3. An electrophotographic reproducing apparatus comprising a document glass plate on which a document to be reproduced is placed, a first scanning means which comprises a reflector having a reflecing surface formed by an elliptic curve and arranged below the document glass plate so that an opening portion of the reflector for exposing the document faces a direction substantially parallel with the surface of said document glass plate, an illuminating lamp for exposure arranged in said reflector, and having a first mirror, a second scanning means which comprises a second mirror, said first and second scanning means movable so that said scanning means moves at half the speed of the speed of said first scanning means, and guide means having two track surfaces extending parallely with each other, one of said track surfaces guiding said first scanning means and the other of said track surfaces guiding said second scanning means.

4. The electrophotographic reproducing apparatus according to claim 3, wherein said first and second scanning means comprising means for moving reciprocally a wire and pulleys.

5. The electrophotographic reproducing apparatus according to claim 4, wherein said means for moving reciprocally a wire and pulleys are provided at both sides of said mirrors.

6. The electrophotographic reproducing apparatus according to claim 3, wherein said guide means comprise U-shaped channels.

7. The electrophotographic reproducing apparatus according to claim 1 wherein said reflector comprises a near side reflecting member and a remote side reflecting member remote from said document glass plate.

8. The electrophotographic reproducing apparatus according to claim 4, wherein two pulleys are mounted on a stationary part, and a wire is trained between said pulleys and a portion of said scanning means, said portion of said scanning means deviating from a straight line connecting contacting portions of said pulleys and wire, so that said scanning means is urged to said track surface.

* * * * *